March 10, 1959    A. C. WEIGEL ET AL    2,877,352
LIQUID LEVEL INDICATOR
Filed Aug. 10, 1953
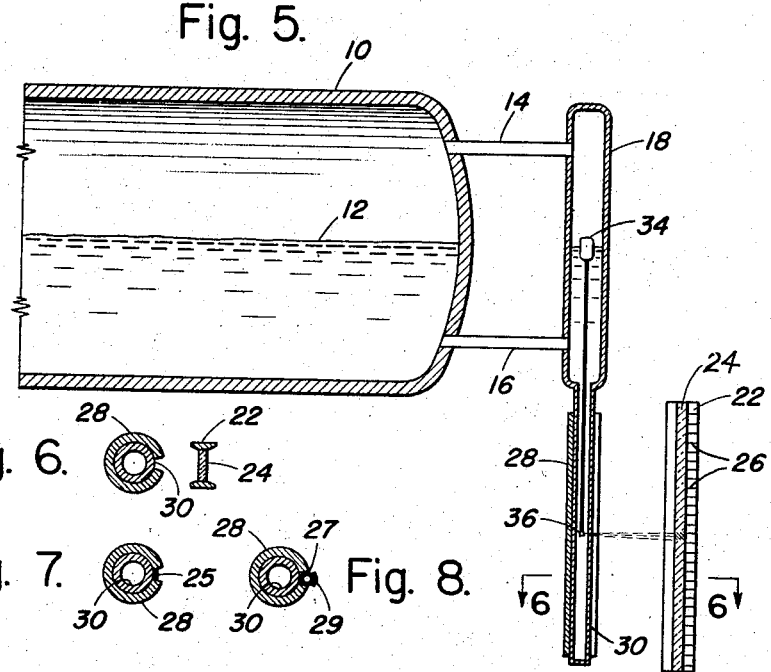
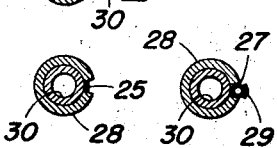
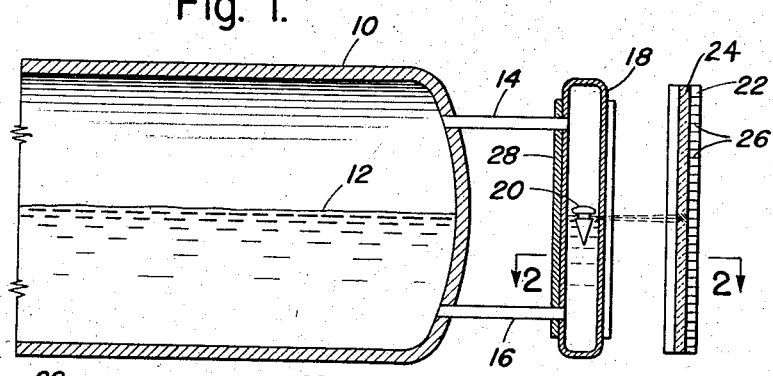
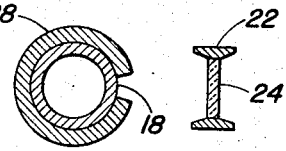
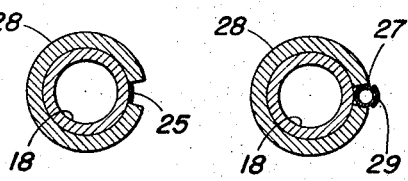
INVENTORS
Albert C. Weigel
John L. Menson
BY
ATTORNEY United States Patent Office 2,877,352
Patented Mar. 10, 1959

2,877,352
LIQUID LEVEL INDICATOR

Albert C. Weigel, East Orange, N. J., and John L. Menson, Greenwich, Conn., assignors to Combustion Engineering, Inc., New York, N. Y., a corporation of Delaware Application August 10, 1953, Serial No. 373,236

12 Claims. (Cl. 250—43.5)

This invention relates to apparatus for determining the level of a liquid within a container and has particular relation to such an apparatus employing a radioactive source movable in accordance with the liquid level and means sensitive to the radiation emitted by this source.

The invention in one of its forms provides a suitable container adapted to receive a liquid and within which the level of the liquid fluctuates. Positioned within this container is a float properly designed and weighted to float upon the surface of the liquid and remain stable in a vertical position. A radioactive source is positioned within the float and the float is provided with suitable shielding for the rays emitted by this source so that these rays are directionalized with their emission being restricted to a horizontal plane. Outwardly of this container is positioned a sensitized screen extending vertically throughout the vertical travel or movement of the float and being constructed and arranged to produce a visual indication where the radiation emitted from the float strikes the screen thereby giving a positive indication of the location of the float and accordingly the liquid level within the container.

In a modified form of the invention, in lieu of positioning the shielded radioactive source in the float it is secured to the end of a rod which extends from the float into a vertical extension of the container which may be of much smaller diameter than the portion of the container which houses the float. In high pressure installations this has the advantages of reducing the amount of radiation absorbed in passing through the container wall thereby giving a sharper and clearer visual indication since for the same internal pressure the wall thickness of this extension is considerably less than the wall thickness of the portion of the container that houses the float.

While liquid level indicating devices employing radioactive floats and the like are well known in the art, all such devices of which applicants are aware require relatively complicated and expensive electronic mechanism to give the desired indication of the liquid level and are dependent upon variations in the intensity of detected radiation to produce this indication. These devices require accurate calibration and adjustment and, as any electronic device, are susceptible to failures as well as producing inaccurate results. Moreover, many such prior art devices are not capable of producing a constant indication of the liquid level but will merely indicate whether this level is above or below a predetermined point.

It is the object of this invention to provide a simple and efficient liquid level indicating device of improved construction and which employs a radioactive source.

Other and further objects of the invention will become apparent to those skilled in the art as the description proceeds.

With the aforementioned objects in view, the invention comprises an arrangement, construction and combination of the elements of the indicator in such a manner as to attain the results desired as hereafter more particularly set forth in the following detailed description of the illustrative embodiments, said embodiments being shown by the accompanying drawing wherein:

Figure 1 is a diagrammatic illustration of a preferred embodiment of the invention showing the float having the radioactive source positioned therewithin;

Figure 2 is a sectional view taken along line 2—2 of Figure 1;

Figure 3 is a sectional view similar to that of Figure 2 but showing a modified form of sensitized screen comprising a coating applied directly to the container wall;

Figure 4 is also a sectional view similar to that of Figure 2 but showing another modified form of sensitized screen which is fluid cooled and thus especially adapted for installations where high temperatures are encountered;

Figure 5 is a diagrammatic illustration similar to that of Figure 1 but showing a modified float arrangement;

Figure 6 is a sectional view along line 6—6 of Figure 5;

Figure 7 is a view similar to that of Figure 6 showing the modified form of sensitized screen comprising a coating applied directly to the container extension;

Figure 8 is also a view similar to that of Figure 6 but showing the fluid cooled form of sensitized screen.

In fluid systems which operate under relatively high pressures and wherein it is essential that the liquid level in a portion of the system be under constant observation, such as in modern high pressure boilers, it is desirable that some means other than the conventional gauge glass, which is of course subject to breakage by both the internal pressure and external shocks, be employed to give the required indication of the liquid level. The organization of the present invention accomplishes this result in a most expeditious and efficient manner.

Referring now to the drawing and particularly to Figures 1 and 2 there is shown a vessel 10 which may be a boiler drum or the like and which is partially filled with a liquid 12 the level of which it is desired to continually keep under observation. Fluidly connected to the end of vessel 10 by vertically spaced conduits 14 and 16 is container 18 which may take the form of a metallic conduit vertically arranged and sealed at its upper and lower ends. Through this arrangement the liquid level within container 18 corresponds to and varies with that in vessel 10.

Disposed within container 18 is float 20 constructed and arranged to float at the surface of the liquid within this container in a stable and upright positon. For this latter purpose the float may advantageously take the form of a cone as illustratively disclosed, but it is to be understood that other float designs may equally well be employed, the only requirement being that the float remain in a predetermined stable position while floating on the surface of the liquid.

Positioned within float 20 is a capsule of radioactive material, such as cobalt 60 or other suitable material, which is capable of emitting penetrating radiation. Suitable shielding for this radiation is also incorporated in the float so that the emitted radiation is restricted to a horizontal plane.

Positioned in parallel relation with container 18 is screen 22 having a vertically arranged sensitized strip 24 which produces a visual indication at the location where it is contacted by the horizontally directed rays emitted by the radioactive material. Suitable indicia or calibrations 26 may be provided on screen 22 to accurately corrolate this visual indication with the depth of liquid in drum 10.

Thus as float 20 moves vertically within container 18 in accordance with the liquid level changes in the container, the horizontal plane in which the rays from the radioactive material are emitted moves with the float causing the visual indication produced on sensitized strip 24 to move vertically along said strip in accordance with the liquid level changes in the container. The visual indication produced on strip 24 thus accurately corresponds to the liquid level in container 18 at all times.

In order to reduce stray radiation to a minimum and thereby protect personnel in the vicinity of the indicator, container 18 is provided with lead coating or shield 28 arranged with a gap extending longitudinally of the container and directly in front of screen 22 thereby confining the emitted radiation to the direction of this screen.

In lieu of having a screen such as 22 where a separate member is spaced from container 18, the screen may take the form of a sensitized strip or coating 25 (Fig. 3) applied directly to the outer surface of container 18 throughout the length of the gap formed by lead shield 28. This organization has the advantage of eliminating the radiation that would be lost in traveling through the air space between container 18 and strip 22 and would thus give a clearer visual indication.

In installations where very high temperatures are encountered in order to protect the sensitized screen from the detrimental effects of such temperatures a fluid cooled screen such as disclosed in Figure 4 may be employed. In this modified form of screen, conduit 27, through which a suitable cooling fluid is conveyed, is positioned in and extends throughout the length of the gap formed by lead shield 28 and has attached to its outer surface sensitized strip or coating 29 which produces a visual indication when the horizontally directed rays from float 20 impinges upon it.

In the embodiment of Figures 5 and 6 container 18 is provided with a downwardly extending cylindrical projection 30 into which extends rod 32 depending from float 34 (although disclosed as extending downwardly projection 30 and rod 32 may, of course, be equally well extended upwardly). To the end of this rod is secured a shielded source of radioactive material 36 arranged so that the emission of the penetrating radiation therefrom is confined preferably to a horizontal plane. Since the shielded source 36 is of considerably smaller diameter than that of float 34 cylindrical extension 30 may be of correspondingly smaller diameter than the upper portion of container 18. Thus for the same pressure in drum 10 the wall thickness of extension 30 will be considerably less than the wall thickness of the upper portion of the container and since it is the wall thickness that determines the amount of radiation absorbed during penetration of the wall by the radiation a much clearer, sharper and more legible indication will be produced with this embodiment of the invention when employed in very high pressure installations. As an example, in an installation where the internal pressure in drum 10 and accordingly in container 18 and extension 30 is 2500#/in.² the wall thickness of container 18 will be ¾" while the wall thickness of extension 30 will be but $\frac{1}{20}$" thereby greatly reducing the radiation loss due to absorption of the radiation by the wall metal.

Screen 22 is positioned adjacent extension 30 so that the directionalized rays will strike sensitized strip 24 and give a visual indication which, with indicia 26, will indicate the liquid level in drum 10.

In order to protect personnel from stray radiation extension 30 is provided with lead coating 28 in the same manner as container 18 in the embodiment of Figures 1 and 2.

As in the case of the embodiment of Figures 1 and 2 in lieu of having a screen such as 22 spaced from extension 30, the screen may take the form of a sensitized strip or coating 25 (Fig. 7) applied directly to the outer surface of extension 30 throughout the length of the gap formed by lead shield 28. Moreover, when high temperatures are encountered the previously mentioned fluid cooled screen may be employed wherein tube 27, through which a suitable cooling fluid is conveyed, is positioned in the gap formed by lead shield 28 and has secured to its outer surface sensitized strip or coating 29 (Fig. 8).

While we have illustrated and described several preferred embodiments of our novel indicator it is to be understood that such is merely illustrative and not restrictive and that variations and modifications may be made therein without departing from the spirit and scope of the invention. We therefore do not wish to be limited to the precise details set forth but desire to avail ourselves of such changes and alterations as fall within the purview of our invention.

What we claim is:

1. An indicating device comprising an active member disposed within a suitable container and arranged to move in a substantially vertical direction therein while occupying a predetermined position, said active member including a radioactive source capable of emitting penetrating radiation and suitable shielding effective to confine the radiation to a horizontal plane, a sensitized screen disposed outwardly of said container and extending throughout the range of movement of said active member, said screen being sensitive to the emitted radiation to produce a visual indication where said radiation impinges upon the same.

2. An indicating device comprising an active member disposed within a suitable container and arranged to move in a predetermined path therein while occupying a predetermined position, said active member including a radioactive source capable of emitting penetrating radiation and suitable shielding effective to confine the radiation to a plane normal to said predetermined path, a sensitized screen disposed outwardly of said container and extending throughout the range of movement of said active member, said screen being sensitive to the emitted radiation to produce a visual indication where said radiation impinges upon the same.

3. A liquid level indicator comprising a container for liquid within which is disposed a float constructed to float in a predetermined position at the surface of the liquid, a radioactive source associated with said float for movement thereby and suitably shielded so as to confine the radiation generally to a plane normal to said movement, a sensitized screen positioned adjacent and outwardly of said container and extending throughout the range of movement of said source, said screen being sensitive to the emitted radiation to produce a visual indication where said radiation impinges upon the same.

4. A liquid level indicator as defined in claim 3 wherein said screen comprises a sensitized surface upon the outer wall of the container.

5. A liquid level indicator as defined in claim 3 wherein said screen is fluid cooled.

6. A liquid level indicator as defined in claim 3 wherein said screen comprises a fluid cooled conduit juxtaposed to said container and having a sensitized coating extending longitudinally thereof throughout the range of movement of the source.

7. A liquid level indicator as defined in claim 3 wherein said screen is spaced a predetermined distance from said container.

8. A liquid level indicator comprising a float constructed and arranged to float in a predetermined position on the surface of a liquid in a container, said float containing a radioactive source capable of emitting penetrating radiation and suitable shielding effective to confine the radiation to a horizontal plane, a vertically disposed sensitized screen juxtaposed to said container outwardly thereof, said screen being sensitive to the emitted radiation to produce a visual indication where said radiation impinges upon the same.

9. A liquid level indicator as defined in claim 8 wherein the float is conical.

10. In an organization of the type described a rugged metallic container adapted to contain a liquid the level of which is adapted to vary within predetermined limits, a float positioned within said container and constructed and arranged to float in said liquid in a predetermined position, said float containing a radioactive source capable of emitting penetrating radiation and suitable shielding effective to confine the radiation to a horizontal plane, a vertically disposed sensitized screen juxtaposed to said container outwardly thereof and extending intermediate said predetermined limits, said screen being sensitive to the emitted radiation to produce a visual indication where said radiation impinges upon the same.

11. A liquid level indicator comprising a container for the retention of a liquid the level of which is adapted to vary, said container including a vertical cylindrical extension, a float positioned within said container to float at the level of the liquid therein, rod means extending from said float into said vertical extension, a radioactive source positioned within said vertical extension and secured to said rod for movement therewith, said source being suitably shielded so that the emitted radiation is restricted to a plane normal to the axis of said extension and having a transverse cross section substantially less than that of the float, the diameter of said extension being but slightly greater than said shielded source and a sensitized screen positioned adjacent said container throughout the range of movement of said source and effective to produce a visual indication where said radiation impinges upon the same.

12. Means for indicating the fluctuating liquid level within a drum comprising a vertical container fluidly interconnected with the upper and lower portions of said drum, the container being of sufficient size intermediate said connection for the reception of a float which floats at the level of the liquid therewithin, said container having a portion which extends vertically outwardly of one of said connections and is of substantially smaller cross sectional area than that of the portion intermediate said connections, rod means extending from said float into said last mentioned portion, a radioactive source connected adjacent the end of said rod for movement therewith within said last mentioned portion and being suitably shielded so that the radiation is restricted to a plane generally normal to the direction of movement of said source, a sensitized screen disposed adjacent but outwardly of said container and extending throughout the range of movement of said source, said screen being sensitive to the emitted radiation from said source to produce a visual indication where said radiation impinges upon the same and calibrates to give an indication of the liquid level in the drum.

References Cited in the file of this patent
UNITED STATES PATENTS

| | | |
|---|---|---|
| 2,456,233 | Wolf | Dec. 14, 1948 |
| 2,641,034 | Harter, Jr. | June 9, 1953 |
| 2,662,985 | Good | Dec. 15, 1953 |
| 2,714,168 | Hencke et al. | July 26, 1955 |